(12) United States Patent
Fernandes Goncalves

(10) Patent No.: US 9,065,312 B2
(45) Date of Patent: Jun. 23, 2015

(54) FRAME HAVING INTEGRATED COOLING FOR AN ELECTRIC DRIVE

(71) Applicant: ETEL S.A., Motiers (CH)

(72) Inventor: Jose Manuel Fernandes Goncalves, Colombier (CH)

(73) Assignee: ETEL S.A., Motiers (CH)

( * ) Notice: Subject to any disclaimer, the term of this patent is extended or adjusted under 35 U.S.C. 154(b) by 223 days.

(21) Appl. No.: 13/927,688

(22) Filed: Jun. 26, 2013

(65) Prior Publication Data

US 2013/0342047 A1 Dec. 26, 2013

(30) Foreign Application Priority Data

Jun. 26, 2012 (EP) .................................. 12173599

(51) Int. Cl.
*H02K 5/20* (2006.01)

(52) U.S. Cl.
CPC ....................................... *H02K 5/20* (2013.01)

(58) Field of Classification Search
USPC ................... 310/52–54, 58–59, 89
See application file for complete search history.

(56) References Cited

U.S. PATENT DOCUMENTS

| | | | |
|---|---|---|---|
| 5,642,013 A | 6/1997 | Wavre | |
| 5,859,482 A * | 1/1999 | Crowell et al. | 310/58 |
| 5,864,187 A | 1/1999 | Gonzalez | |
| 5,923,108 A * | 7/1999 | Matake et al. | 310/89 |
| 6,489,701 B1 * | 12/2002 | Gamble et al. | 310/179 |
| 7,322,103 B2 | 1/2008 | Burjes et al. | |
| 7,591,147 B2 * | 9/2009 | Masoudipour et al. | 62/505 |
| 7,777,374 B2 * | 8/2010 | Ressel | 310/59 |
| 7,965,002 B2 * | 6/2011 | Savant | 310/52 |
| 2004/0130223 A1 * | 7/2004 | Nimz et al. | 310/58 |
| 2005/0151431 A1 * | 7/2005 | Cronin et al. | 310/60 A |
| 2005/0268464 A1 | 12/2005 | Burjes et al. | |
| 2008/0001487 A1 * | 1/2008 | Wei et al. | 310/54 |
| 2008/0231125 A1 * | 9/2008 | Verrier et al. | 310/52 |
| 2011/0101802 A1 * | 5/2011 | Hennings et al. | 310/58 |

FOREIGN PATENT DOCUMENTS

| | | |
|---|---|---|
| DE | 10 2010 042 259 | 4/2012 |
| EP | 0 868 012 | 9/1998 |

* cited by examiner

*Primary Examiner* — Thanh Lam
(74) *Attorney, Agent, or Firm* — Kenyon & Kenyon LLP

(57) ABSTRACT

In a frame having integrated cooling for an electric drive, coolant flows through a width of the frame in an inverse manner. The frame has roughly the form of a cylinder sleeve having a diameter and an axial width, whose outer surface is provided with cooling ducts. A first bundle of cooling ducts, connected in parallel, guides the coolant from a coolant intake around substantially the entire circumference of the frame. A second bundle of cooling ducts, connected in parallel, guides the coolant around substantially the entire circumference of the frame, back to a coolant outlet (8).

7 Claims, 1 Drawing Sheet

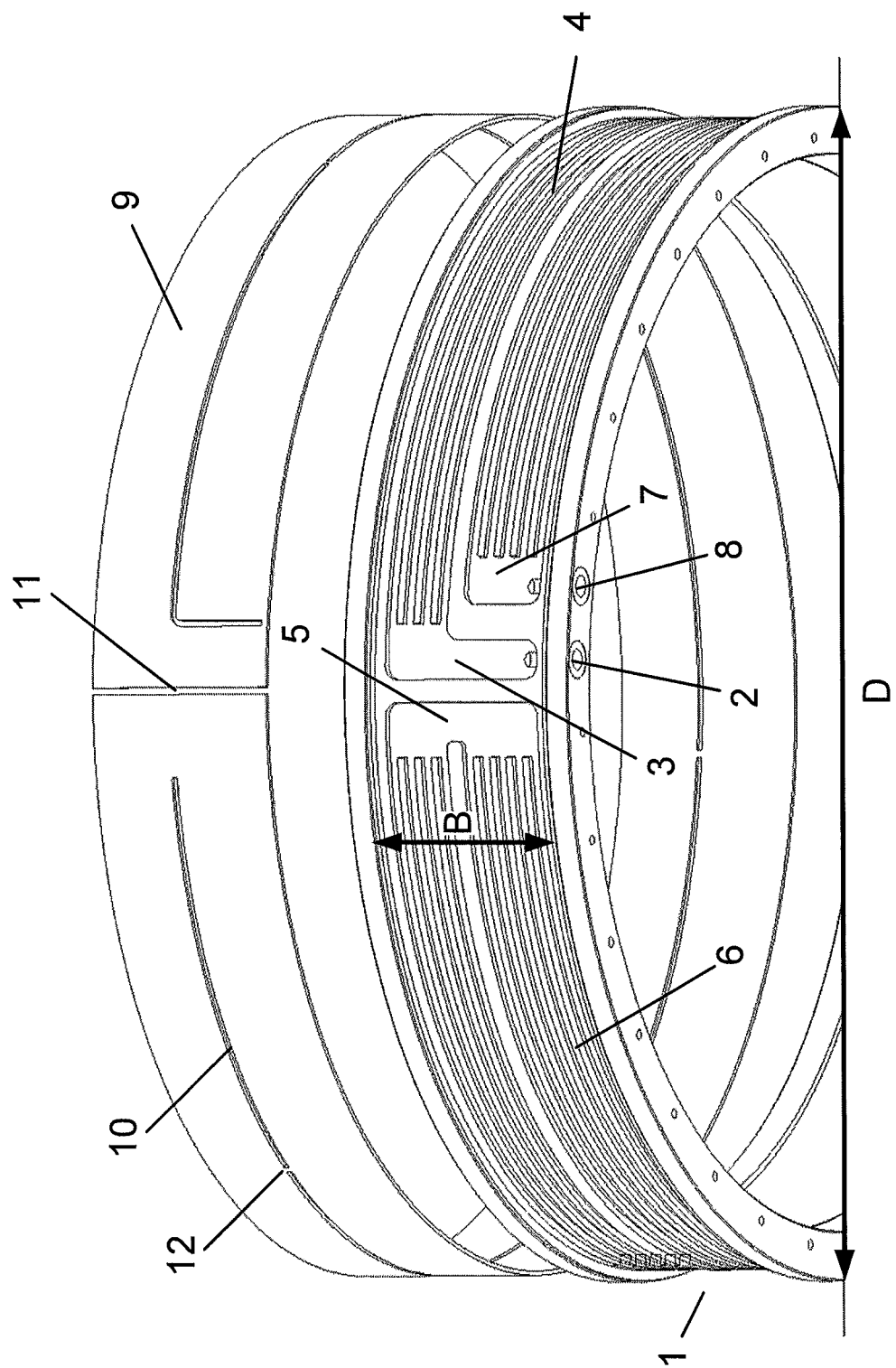

FRAME HAVING INTEGRATED COOLING FOR AN ELECTRIC DRIVE

CROSS-REFERENCE TO RELATED APPLICATIONS

The present application claims priority to Application No. 12173599.7, filed in the European Patent Office on Jun. 26, 2012, which is expressly incorporated herein in its entirety by reference thereto.

FIELD OF THE INVENTION

The present invention relates to a frame which may be used for surrounding and cooling an iron core of an electric drive.

BACKGROUND INFORMATION

Such frames form the mechanical interface between the drive and the machine connected to this drive. Since it is frequently useful to prevent an input of heat into the machine, cooling of the drive at this interface is especially expedient.

Electric drives, especially synchronous drives, which are able to be directly connected to the application without mechanical transformation, are described in U.S. Pat. No. 5,642,013. Here, using mainly the example of linear motors, it is illustrated how such drives can be designed in order to avoid detent torques, or to at least reduce them markedly. To cool these engines (which are able to generate a force or a torque even at standstill and thus without the cooling effect of moving air), cooling ducts between the teeth of the iron core accommodating coils are suggested in this instance. However, such cooling ducts reduce the filling factor of the interspaces of the teeth, so that the engines are ultimately less powerful than those having more windings per coil. In FIG. 15 of U.S. Pat. No. 5,642,013, a rotary synchronous motor is shown as well. Example embodiments of the present invention are particularly suitable for engines of this type. As far as the details of such an electric drive are concerned, U.S. Pat. No. 5,642,013 is expressly incorporated herein in its entirety by reference thereto.

European Patent No. 0 868 012 also describes a linear synchronous motor, which, however, is cooled from the rear side of the laminated core, i.e., from the side lying across from the teeth and coils. Toward that end, the iron core cast in epoxy resin sits in an actively cooled frame made of metal, on whose rear side, i.e., facing away from the teeth and coils of the iron core, cooling ducts extend. In an exemplary embodiment, the intake and outlet for the coolant are arranged next to each other at the same end of the linear motor. A meander-shaped cooling duct makes its way toward the opposite located end of the linear motor and back again from there, so that the cooling effect is evenly distributed across the entire length of the engine. However, such meander-shaped cooling ducts are very difficult to produce during the machining due to the frequent changes in direction, and they cause a considerable pressure drop because of their significant length.

SUMMARY

Example embodiments of the present invention provide frames for electric drives and, for example, make it possible to use such a frame having integrated cooling in conjunction with a rotary drive.

According to example embodiments of the present invention, a frame includes integrated cooling for an electric drive, in which the coolant inversely traverses a width of the frame. The frame has roughly the form of a cylinder sleeve with a diameter and an axial width, whose outer surface is provided with cooling ducts. A first bundle of cooling ducts, connected in parallel, guides the coolant from a coolant intake substantially around the entire circumference of the frame, and a second bundle of coolant ducts, connected in parallel, guides the coolant virtually around the entire circumference of the frame, back to a coolant outlet.

Because of the inverse flow through the frame, the coolant temperature, averaged across the width of the frame, is constant across wide regions of the frame, since particularly cold and particularly warm coolants flow next to each other (but in opposite directions) in the region of the coolant intake and coolant outlet, whereas the coolant in the first and the second bundle has substantially the same average temperature in the vicinity of the reversal region.

Due to the parallel connection of a plurality of coolant ducts in each case, the pressure drop in the coolant circuit is kept low. The energy expenditure for cooling the drive is considerably reduced as a result. At a given pressure in the coolant circuit, the flow rate, and thus the heat transfer into the coolant, rises.

When designing the frame, a simple production is of considerable importance. For example, the coolant circuit is able to be cut into the frame quite easily, using straight paths for the most part. A sleeve for sealing the cooling ducts then is able to be joined to the frame in a very simple manner thanks to suitable slots.

Further features and aspects of example embodiments of the present invention are described in more detail below with reference to the appended FIGURE.

BRIEF DESCRIPTION OF THE DRAWING

FIG. 1 illustrate a frame having integrated cooling for an electric drive.

DETAILED DESCRIPTION

FIG. 1 shows a frame 1, which is able to accommodate the laminated core of a stator of an electric drive, may be used as a mechanical interface for the drive and is able to actively cool the drive. The frame is substantially in the form of a cylinder sleeve and made of a metal, such as steel, aluminum, etc. The stator of a rotor-driven drive as described above, for example, is inserted into the interior of the frame. The heat produced in the coils of the drive is dissipated to frame 1 via the iron core of the drive. Active cooling of frame 1 consequently serves the purpose of cooling the drive, and insulates the actual application from the heat source.

Frame 1 is provided with a coolant intake 2 for this purpose, which is implemented as axial bore in an end face of the frame. The bore which is provided with an internal thread for connecting a coolant line ends in an intake region 3 produced in the form of a depression in the surface of the frame. For this purpose, for example, a pocket is cut into on the surface of the frame using a machining process.

Starting from intake region 3, the coolant (such as water including suitable additives as protection against rust and freezing) is routed through a first bundle of coolant ducts 4 extending and connected in parallel, around substantially the entire circumference of the frame. The parallel pattern of the individual ducts is able to be produced especially easily, since all that is required is cutting straight grooves into the surface of the frame. The parallel connection of the individual cooling ducts additionally results in a considerable reduction of the pressure drop in the coolant circuit. Nevertheless, the plurality of relatively narrow cooling ducts 4 results in excellent contact between the coolant and frame 1 and in this manner ensures an excellent heat transfer into the coolant. If possible, the form of the coolant ducts and the speed of the coolant should be selected such that a flow that is turbulent rather than laminar results, because the heat transfer into the coolant is better in such a case.

The first bundle of cooling ducts 4 ends after a substantially complete round-trip pass around the frame, at a reversing region 5, which lies close to intake region 3, but is not connected thereto. A substantially complete round-trip pass or a substantially entire circumference refers to the feature that the coolant ducts connect intake region 3, which lies adjacently on the surface of the frame, to reversal region 5. This requires a nearly complete round-trip pass. Only a region taken up by intake region 3 and reversal region 5 is missing.

The coolant is mixed in reversal region 5, so that a temperature adjustment takes place if the coolant in individual ducts 4 of the first bundle is heated unevenly.

From reversal region 5, the coolant travels through a second bundle of cooling ducts 6 into an outlet region 7, this second bundle likewise extending across substantially the entire circumference of frame 1. The number of cooling ducts 4, 6 in the first and second bundle need not necessarily be identical. Depending on the available space, this number may differ by 1, for example, as illustrated FIG. 1.

Outlet region 7 ultimately has the same configuration as intake region 3.

If width B of frame 1 is split into two axially offset halves, then first bundle 4 is located in one of the two halves, and second bundle 6 is located in the other half.

Since the coolant travels through frame 1 in inverse manner and is heated relatively uniformly on its way through frame 1, the temperature of the coolant when averaged across width B is constant across the circumference of the frame. Uniform cooling of the drive is achieved as a result.

In order to be able to place coolant intake 2 and coolant outlet 8 on the same front end of frame 1, intake region 3 extends across both frame halves, i.e., across substantially the entire width B of frame 1.

To seal coolant ducts 4, 5, intake region 3, reversal region 5 and outlet region 7, a sleeve 9 is placed around frame 1 and sealingly connected to the frame. Sleeve 9 is welded to frame 1 at the two annular edges for this purpose. In addition, sleeve 9 has first and second slots 10, 11, along which it is likewise welded to the frame. As an alternative, the sleeve could also be fixed in place on the frame by bonding or a screwed connection and suitable seals.

First slot 10 of sleeve 9 extends between first and second bundle 4, 6 of coolant ducts and seals these two regions from each other. In addition, first slot 10 bends such that it reaches an edge of sleeve 9 between intake region 3 and outlet region 7. Thus, these two regions are sealed from each other as well. Furthermore, slot 10 is interrupted by crosspieces 12, which give sleeve 9 a certain stability prior to its installation.

Second slot 11 separates the sleeve axially and extends between reversal region 5 and intake region 3. After the sleeve is welded along this second slot 11, these two regions are sealed from each other. Nevertheless, a certain exchange of coolant may take place between the individual ducts 4, 6 of the first and second bundle, which does not interfere with the function of the coolant circuit, however.

The predominantly straight extension of the welding seams provided for connecting frame 1 and sleeve 9 in turn makes for a relatively simple production process. In addition, sleeve 9 itself is able to be produced in an uncomplicated manner from flat sheet metal and then can be bent around frame 1.

It is also possible to operate the coolant circuit in the opposite direction. This will not change anything in the device. Instead, it will simply mean that intake region 3 and outlet region 7 as well as intake 2 and outlet 8 switch their functions.

What is claimed is:

1. A frame having integrated cooling for an electric drive, in which coolant is flowable inversely through a width of the frame, comprising:
   a cylindrical sleeve having a diameter and an axial width;
   a coolant intake;
   a coolant outlet; and
   cooling ducts arranged on an outer surface of the cylindrical sleeve;
   wherein a first bundle of cooling ducts are connected in parallel and are adapted to guide the coolant from the coolant intake around substantially an entire circumference of the sleeve;
   wherein a second bundle of cooling ducts are connected in parallel and are adapted to guide the coolant around substantially the entire circumference of the frame back to the coolant outlet;
   wherein the first bundle of cooling ducts, the second bundle of coolant ducts, a reversal region, and an outlet region are sealed by a further cylindrical sleeve that rests against an outer periphery of the frame;
   wherein the further sleeve is welded to the frame; and
   wherein the further sleeve includes a first slot arranged between the first bundle of cooling ducts and the second bundle of cooling ducts and between an intake region and an outlet region, the further sleeve welded to the frame along the first slot.

2. The frame according to claim 1, wherein the further sleeve includes a second slot arranged in an axial direction between a reversal region and the intake region, the further sleeve welded to the frame along the second slot.

3. The frame according to claim 1, wherein the first bundle of cooling ducts discharges into an axially extending reversal region, the second bundle of cooling ducts branching off from the reversal region at an axial offset to the first bundle of cooling ducts.

4. The frame according to claim 1, wherein the coolant intake discharges into the intake region, the first bundle of coolant ducts branching off from the intake region, the second bundle of coolant ducts discharging into the outlet region that is connected to the coolant outlet.

5. The frame according to claim 4, wherein the coolant intake and/or the coolant outlet includes axial bores in the frame connected to the intake region and/or the outlet region.

6. The frame according to claim 1, wherein each bundle of coolant ducts includes a plurality of grooves extending parallel to each other on the circumference of the frame.

7. An electric drive, comprising:
   a stator including a laminated core; and
   the frame recited in claim 1 surrounding the laminated core of the stator.

* * * * *